(12) United States Patent
Gschwind et al.

(10) Patent No.: US 8,972,788 B2
(45) Date of Patent: Mar. 3, 2015

(54) TICKET CONSOLIDATION

(75) Inventors: Michael K. Gschwind, Chappaqua, NY (US); Ruchi Mahindru, Elmsford, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 13/348,172

(22) Filed: Jan. 11, 2012

(65) Prior Publication Data

US 2013/0179736 A1 Jul. 11, 2013

(51) Int. Cl.
*G06F 11/00* (2006.01)
(52) U.S. Cl.
USPC .................................. 714/37; 714/45; 714/25

(58) Field of Classification Search
USPC .......................................... 714/37, 25, 48, 57
See application file for complete search history.

(56) References Cited

U.S. PATENT DOCUMENTS

| 7,493,518 | B2 | 2/2009 | Anderson et al. | |
| 2008/0155564 | A1* | 6/2008 | Shcherbina et al. | 719/318 |
| 2010/0251363 | A1* | 9/2010 | Todorovic | 726/22 |
| 2010/0325495 | A1* | 12/2010 | Talla et al. | 714/49 |
| 2011/0149721 | A1* | 6/2011 | Yang et al. | 370/216 |

* cited by examiner

*Primary Examiner* — Sarai Butler
(74) *Attorney, Agent, or Firm* — Scully, Scott, Murphy & Presser, P.C.; Louis J. Percello, Esq.

(57) ABSTRACT

A method of ticket consolidation in computing environment may in one aspect analyze problem reports, determine whether problems reported by machines are caused by the same or substantially the same run-time configuration error or are occurring on the same physical server, and are within the given sensitivity time window, consolidate the problem tickets and increase the priority of the consolidated ticket.

29 Claims, 8 Drawing Sheets

TICKET CONSOLIDATION

FIELD

The present application relates generally to computers, computer operating systems, computer virtual machines, and more particularly to ticket consolidation in computer systems.

BACKGROUND

In information technology management, enterprises are moving from physical servers toward virtualization, virtual machines (VMs) and cloud computing. Cloud computing offers a virtual environment, where several operating systems images are executed concurrently on the same physical server as VMs. System support monitors operation of a cloud computing environment and generates tickets for events causing problems to be resolved by system administrators. A virtual machine (VM) can encounter run time configuration problems, i.e., problems which were not known at the time when they were configured. Examples of such errors are a backup DNS server configuration, or a backup printer configuration (or some other shared resource or configuration attribute). If this configuration problem is encountered at a run time by a single VM, all other VMs attempting to use that shared resource will also encounter the identical problem. Similarly, if a single VM encounters a hardware-related problem on the machine it is executed on, for example such as an adapter failure, all other VMs running on the same machine and attempting to use that shared resource will also encounter the identical problem. Consequently, these VMs—or users associated to these VMs, or automated management functions associated to these VMs, or other human or programmatic agents corresponding to these VMs—will open multiple problem tickets due to the same cause.

Every open problem ticket has to be handled independently by system administrators, costing time and effort, even if that problem was resolved in the meantime. The inventors in the present disclosure have recognized that there is a need to consolidate problem tickets caused by the same failure in a compute environment, for instance, to save unnecessary work of system administrators or the like.

BRIEF SUMMARY

A method of monitoring and consolidating problems in a computing environment may be provided. The method, in one aspect, may include analyzing a problem report generated associated with a machine in the computing environment. The method may also include identifying if a problem indicated in the problem report has also been reported in another machine having same runtime configuration as the machine, and if said problem has been reported in said another machine having the same runtime configuration, determining whether the generated problem report and the problem reported in said another machine are within a given sensitivity time window. If the generated problem report and the problem reported in said another machine are determined to be within the given sensitivity time window, the method may further include consolidating the generated problem report and the problem reported in said another machine into a single representative problem ticket. If the generated problem report and the problem reported in said another machine are determined to be outside the given sensitivity time window, the method may include generating a new problem ticket including information associated with the generated problem report. In one aspect, the machine and said another machine are homogeneous virtual machines having same runtime configuration settings, wherein the machine and said another machine are two different virtual machine instances created from same configuration template. In another aspect, the machine and said another machine are physical server machines having same physical resources.

Yet in another aspect, a method of monitoring and consolidating problems detected in virtual machines running on one or more hypervisors in a computing environment may be provided. The method, in one aspect, may include analyzing a generated problem report associated with a virtual machine. The method may also include identifying a hypervisor running the virtual machine. The method may further include determining whether there exists same or substantially same problem reported associated with the identified hypervisor. In response to determining that there exists the same or substantially same problem reported associated with the identified hypervisor, the method may include determining whether the generated problem report and the same or substantially same problem reported associated with the identified hypervisor are within a given sensitivity time window. In response to determining that the generated problem report associated with the virtual machine and the same or substantially same problem report associated with the identified hypervisor are within the given sensitivity time window, the method may further include consolidating the generated problem report associated with the virtual machine and said existing same or substantially same problem report associated with the identified hypervisor.

A system for monitoring and consolidating problems in a computing environment, in one aspect, may include a ticket consolidator module operable to execute on the processor and further operable to analyze a problem report generated associated with a machine in the computing environment. The ticket consolidator module may be further operable to identify if a problem indicated in the problem report has also been reported in another machine having same runtime configuration as the machine, and if said problem has been reported in said another machine having the same runtime configuration, the ticket consolidator module may be operable to determine whether the generated problem report and the problem reported in said another machine are within a given sensitivity time window. If the generated problem report and the problem reported in said another machine are determined to be within the given sensitivity time window, the ticket consolidator module may be operable to consolidate the generated problem report and the problem reported in said another machine into a single representative problem ticket. If the generated problem report and the problem reported in said another machine are determined to be outside the given sensitivity time window, the ticket consolidator module may be operable to generate a new problem ticket including information associated with the generated problem report.

In another aspect, a system for monitoring and consolidating problems detected in virtual machines running on one or more hypervisors in a computing environment, may include a ticket consolidator module operable to analyze a generated problem report associated with a virtual machine and identify a hypervisor running the virtual machine. The ticket consolidator module may be further operable to determine whether there exists same or substantially same problem reported associated with the identified hypervisor, and in response to determining that there exists the same or substantially same problem reported associated with the identified hypervisor, the ticket consolidator module may be further operable to determine whether the generated problem report and the same or substantially same problem reported associated with the identified hypervisor are within a given sensitivity time window. In response to determining that the generated problem report associated with the virtual machine and the same or substantially same problem report associated with the identified hypervisor are within the given sensitivity time window, the ticket consolidator module may be further operable to consolidate the generated problem report associated with the virtual machine and said existing same or substantially same problem report associated with the identified hypervisor.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A ticket, also referred to in the present disclosure, as a problem ticket, is an element or object that contains information, for example, relating to a problem in a computer system or a network of computer systems. Tickets may be generated automatically by a monitoring software or system that monitors system operations and detects events occurring in the computer system for which one or more tickets should be generated. Tickets may be also generated by a technical support personnel or the like based on problems reported by customers or end users or the like. A ticket may have a unique reference number for keeping track of the tickets. Tickets are usually assigned to an appropriate individual to resolve the issues indicated in the tickets.

In one embodiment of the present disclosure, a methodology and system may be provided that monitors, reports problems in a computing environment, and opens problem tickets to be handled by system administrators. In one embodiment of the present disclosure, mechanisms for ticket consolidation are provided for analyzing problem tickets generated by machines encountering the runtime errors and consolidating the tickets. The machines in one embodiment may include virtual machines running on a single physical server (hardware). The machines in another embodiment may include virtual machines running on multiple physical servers (hardware). Yet in another embodiment, the machines may include virtual machines with the same or identical configuration, referred to herein as homogeneous virtual machines. The machines in yet another embodiment may include a plurality of physical servers (hardware) running operating systems.

The terms virtual machines and VMs are used interchangeably in the present disclosure. Homogeneous VMs are virtual machines with the same configurations. Homogeneous VMs each may run on different physical servers or hosts but have the same configuration, for instance, generated from the same VM template. Briefly, a VM template provides an operating system image with pre-configured software and/or hardware settings. A VM template may be used repeatedly to create VMs configured with those settings. A ticket consolidator of the present disclosure in one embodiment may identify if problems reported by homogeneous VMs are caused by the same run-time configuration error, for instance, by identifying problem tickets that are caused by the same problem on homogeneous VMs due to its configuration. The tickets generated by the same problem on homogeneous VMs are consolidated into a single representative problem ticket, which may be then given a higher priority than would be given for a regular ticket generated by the same problem. The consolidated ticket, e.g., with higher priority, may be entered into the problem ticket handling system, for example, into an incident monitoring and handling system and incident management system. The ticket consolidator in one embodiment takes into account a given sensitivity time window to consolidate these identified tickets.

The types of problems uncovered in homogeneous VMs, which can be consolidated, may include but are not limited to, a configuration error detected at runtime. For instance, a discovery may be made at runtime that domain name system (DNS) configuration of a server has an error. As another example, a primary or backup printer may be misconfigured or disconnected, which causes all VMs attempting to print to generate tickets. Those tickets which pertain to the same configuration error may be consolidated.

Figure 1:
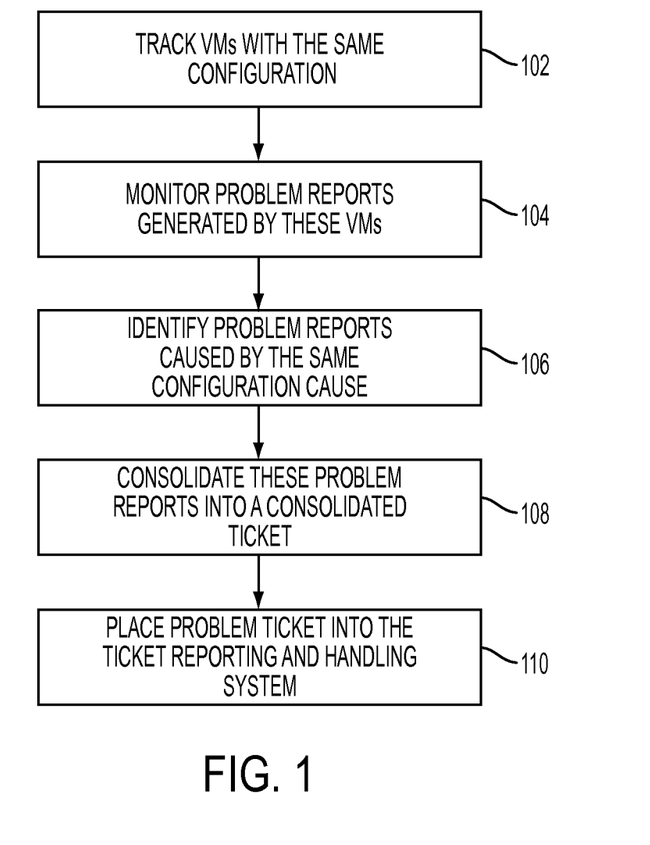
FIG. 1 is a flow diagram illustrating a control flow for ticket consolidation in which a plurality of tickets may be generated due to a runtime error.

FIG. 1 is a flow diagram illustrating a control flow for ticket consolidation in which a plurality of tickets may be generated due to a runtime error. At 102, VMs with the same configuration may be tracked. In one embodiment of the present disclosure, a table (e.g., referred to herein as a VM ID table) or the like may be created to keep track of VMs with the same configuration, for instance, using VM's identifiers (IDs) and hypervisor's identifiers (hIDs). A hypervisor allows multiple virtual machines and/or operating system to run on a host computer. Another table (e.g., referred to herein as a problem reports table) or the like may be generated to store problem reports from those VMs. This table may keep track of events, problem symptoms, message ID, and a timestamp describing the time the problem report was generated.

At 104, problem reports generated by the VMs being tracked are monitored.

At 106, problem reports caused by the same configuration are identified. A root cause analyzer or the like may determine that the problem reports or tickets have the same or substantially the same cause.

At 108, the problem reports identified as being from the same configuration error are consolidated into one ticket.

At 110, the consolidated ticket is placed into a ticket reporting and handling system.

Figure 2:
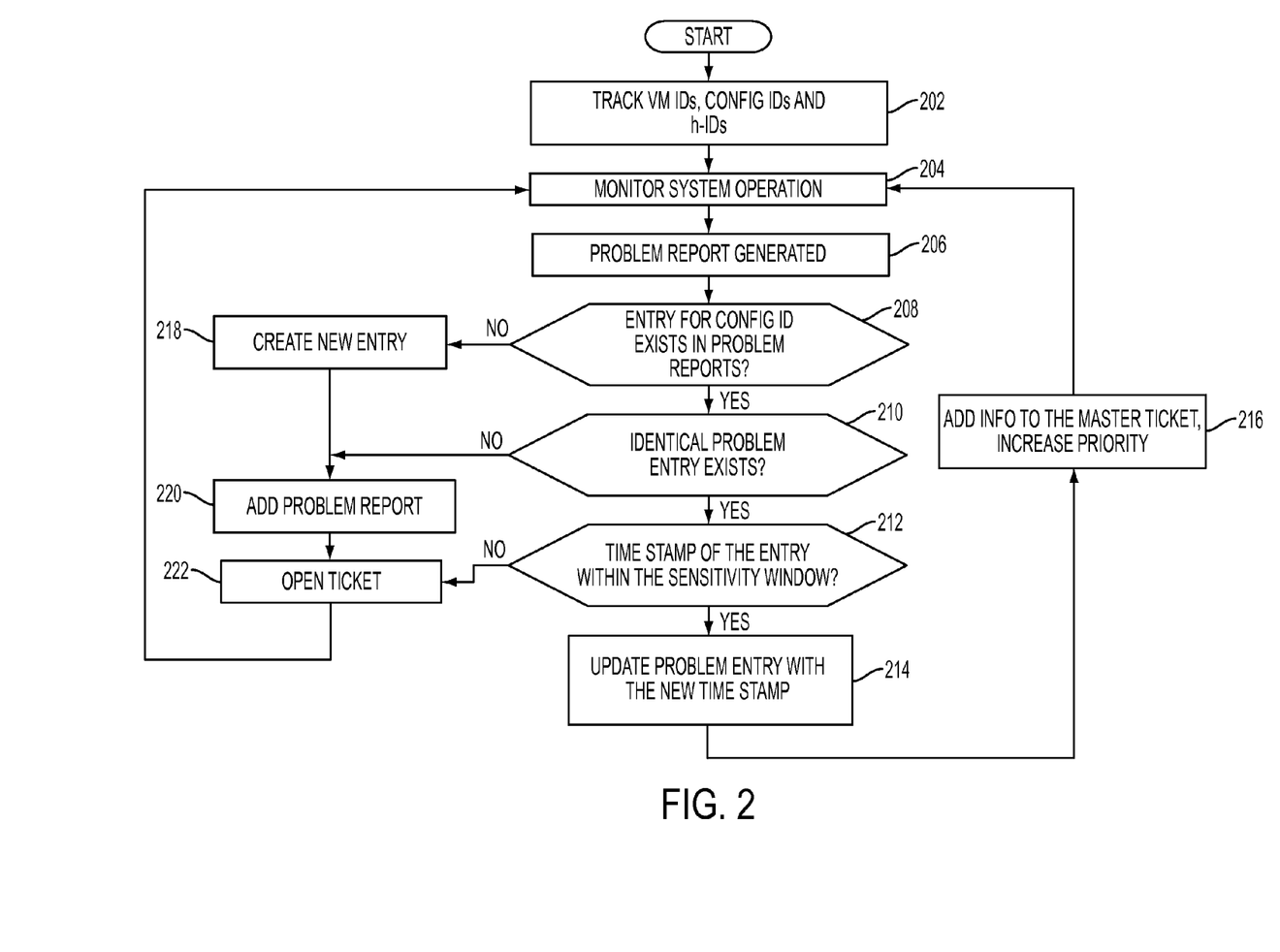
FIG. 2 is a flow diagram illustrating ticket consolidation in one embodiment of the present disclosure in more detail.

FIG. 2 is a flow diagram illustrating ticket consolidation in one embodiment of the present disclosure in more detail. At 202, VM IDs, config IDs (configuration identifiers), and hIDs are tracked. For example, virtual machines (identified by VM IDs) and their configurations (identified with config IDs) may be identified and kept in the VM ID-config ID table. All VMs with the same configuration will have different VM IDs, but identical config IDs. At 204, system operations are monitored. At 206, a problem report that is generated is detected. At 208, it is determined whether an entry associated with the configuration identifier, config ID of the virtual machine that generated the detected problem exists in the problem reports table. If at 208, it is determined that no entry for this config ID exists in the problem reports table, a new entry with this config ID is created in the problem report table at 218, and the problem report generated by this VM and VM ID of this VM are added to the new entry in the problem reports table at 220, and at 222, a ticket is opened for this problem.

At 208, if it is determined that the config ID exists in the problem reports table, the problem reports table is checked and updated to include information about each newly generated problem report. For instance, it is determined whether a configuration identifier of the virtual machine that generated the detected problem report exists in the problem reports table, for instance, by comparing the config ID of the virtual machine that generated the detected problem report with the entries in the problem reports table. Configuration IDs of virtual machines may be determined by using an access method that maps virtual machines and configuration IDs. For example, access method such as getVMID (config ID) may be provided which tracks configIDs and can map to look up VM IDs for desired configuration ID and vice verse. If one or more entries for virtual machines having the same configuration exist in the problem reports table, at 210, it is determined whether the problem report associated with the one or more entries are identical or substantially identical to the detected problem report, or otherwise pertain to the same or substantially the same problem indicated in the detected problem report. Whether the problem indicated in the detected problem report and those found in the entries of the problem reports table are the same may be determined automatically by utilizing route cause analyzer or an automatic text or data processing utility or the like that compares the reports (or tickets). The format of the problem reports table may vary. For instance, an entry in the problem reports table may include VMID, associated config ID, and the description or the like of the problem reported for that VMID/config ID and/or other information.

If it is determined that an entry exists in the problem reports table associated with the same or substantially the same problem as in the detected problem report, the time stamp on that entry is checked to determine at 212 whether the time stamp of the entry is within a sensitivity time window for ticket correlation. The sensitivity time window is a threshold specifying a time window, a time range or period. The sensitivity time window is configurable and/or programmable in one embodiment. If there is an existing entry with the same symptom recorded in the problem reports table, and its time stamp is within the sensitivity time frame, then the detected problem report is consolidated with the existing entry as shown at 214 and 216. At 214, the existing entry in the problem reports table is updated with the new time stamp (the time stamp of the detected problem report). In one embodiment, the priority of the problem report (ticket) is raised or increased to have higher priority, and the ticket having the consolidated information becomes a "master ticket" for multiple problems. In another embodiment, a new entry to the table may be added with the new ticket ID number, and containing the information about the "master ticket" with the same problem and in the sensitivity time window. Similarly, a reference to the "master ticket" may be added to all related individual tickets for reporting and customer support. In at least one problem resolution flow, when a master ticket exists, problem resolution actions will be directly attributed to master tickets, but may later be assessed to multiple underlying tickets or VMs for billing purposes.

At 216, in one embodiment, information that more than one problem report associated with this particular problem is added to the "master" problem ticket and its priority is increased to escalate existing "master ticket". In another embodiment, when a new ticket is created for every new problem report, information about previously generated "master" problem ticket is added to said newly created ticket. The problem ticket is placed into a ticket reporting and handling system. The processing returns to monitoring the system operations at 204.

Thus, as described above, in one embodiment of the present disclosure, the tickets indicating the same or substantially the same problem with the time stamps within the same sensitivity time window may be consolidated into one ticket. In another embodiment, multiple tickets may be allowed to exist with the tickets being linked to one another, or marked such that the group of tickets with the same problem or substantially the same problem may be readily and automatically identified.

If at 208, it is determined that the entry for config ID does not exist, the entry for problem report is created at 218. At 220, the detected problem report is added to the problem reports table including the time stamp indicating the time the problem occurred, and VM ID and config ID information. At 222, a ticket is opened for this detected problem report.

If at 210, it is determined that there is no identical problem entry existing in the problem reports table, the processing proceeds to add the problem report to the problem reports table at 220. If at 212, it is determined that the time stamp of the entry in the problem reports table is outside the sensitivity time window, the processing continues at 222 to open the problem ticket. The processing returns to monitoring the system operations at 204.

The term "problem report" refers to an entry in the problem reports table. The term "problem ticket" refers to an entry which enters ticket reporting and handling system, for handling by a system administrator. Generally, a problem report can become a problem ticket.

Figure 3:
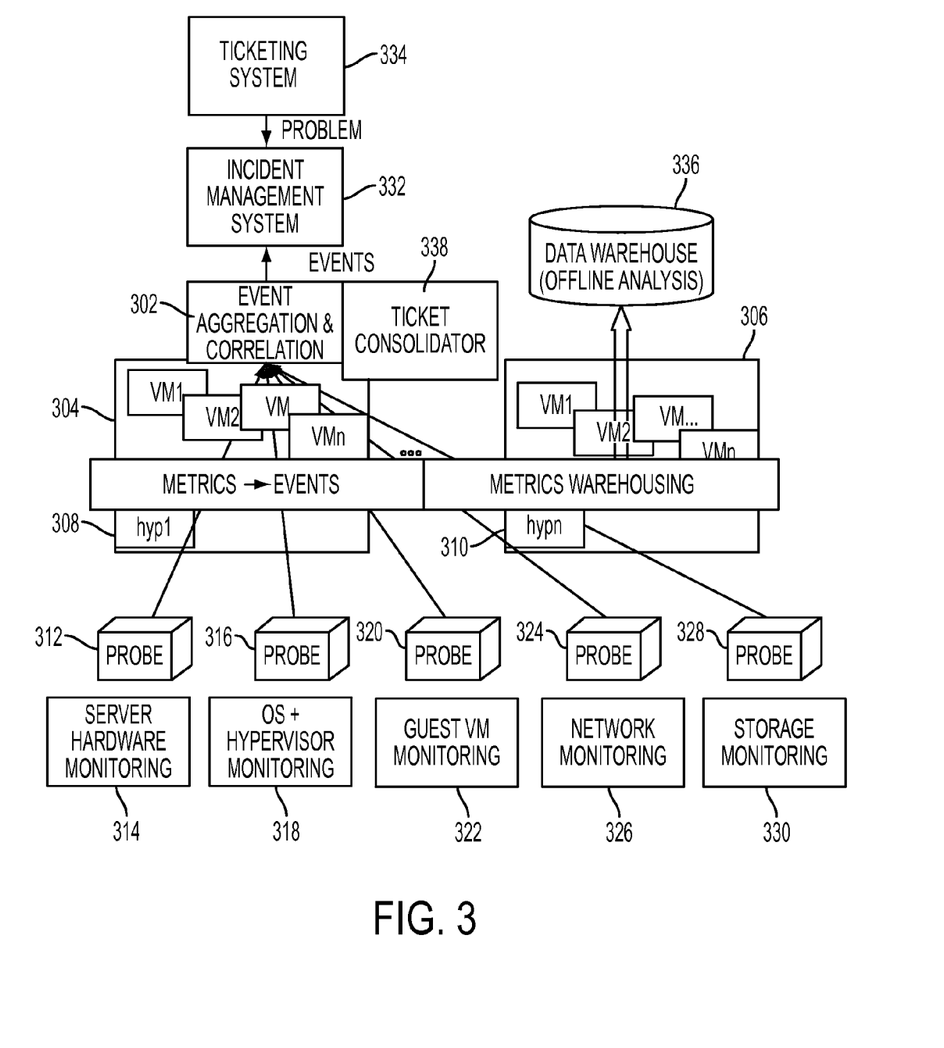
FIG. 3 is an architectural diagram illustrating a ticket consolidator at a central level in one embodiment of the present disclosure.

FIG. 3 is an architectural diagram illustrating a ticket consolidator at a central level in one embodiment of the present disclosure. In this embodiment, a ticket consolidator 338 may be implemented for a group of servers 304, 306, e.g., physical machines also referred to as hosts, at the event aggregation and correlation level 302. Each server or host 304, 306 may run a hypervisors 308, 310, respectively that support multiple operating systems, providing a multiple virtual machine environment. One or more monitoring tools such as Server Hardware Monitoring 314, Operating System (OS) and Hypervisor Monitoring 318, Guest VM monitoring 322, Network Monitoring 326 and Storage Monitoring 330 may employ associated probes 312, 316, 320, 324, 328, respectively, to monitor system operations. Probes are agents that collect metrics from the end nodes (e.g., VMs, servers, processors). For instance, one or more server hardware monitoring probe 312 may collect metrics related to server hardware; an OS and hypervisor monitoring probe 316 may collect measurement data related to operating systems and hypervisors, guest VM monitoring probe 320 may collect metrics data related to guest VMs on the system, network monitoring probe 324 may collect metrics data associated with the network, and storage monitoring probe 328 may collect metrics associate with storage systems. Other probes and monitoring may be present. Based on the rules and policies, events are raised from the metrics that indicate an abnormal or problem condition. A problem report is also referred to as an event.

The event aggregation and correlation module 302 may receive events based on the metrics associated with the various system operations collected by the probes (e.g., 312, 316, 320, 324, 328), and merge any duplicate events, and/or integrate multiple events into a fewer representative ones. The monitoring tools (e.g., 314, 318, 322, 326, 330) may automatically generate tickets and/or events in the event aggregation and correlation module 302 based on the metrics collected by the probes (e.g., 312, 316, 320, 324, 328). An Incident Management System 332 may collect the generated tickets and assign tasks to appropriate individuals such as system administrators or technical support persons to handle and resolve the problems indicated in the tickets. A Ticketing System 334 may also generate tickets, for instance, based on customer reported problems or issues. Metrics and/or correlated events may be warehoused and stored, for example, in a data warehouse 336.

In one embodiment of the present disclosure, the ticket consolidator of the present disclosure may detect problem reports associated with VMs generated based on the metrics collected from the probes. Problem reports may also come from customer input associated with a ticketing system 334, or an automated problem reporting that generates tickets based on data reported by probes, and aggregated into problem reports by 302. The ticket consolidator of the present disclosure analyzes those problem reports and consolidates identical reports into a single ticket, for instance, as described above in reference with FIGS. 1 and 2. Tickets may be created with customer name, problem description, severity, priority, and other information.

Figure 4:
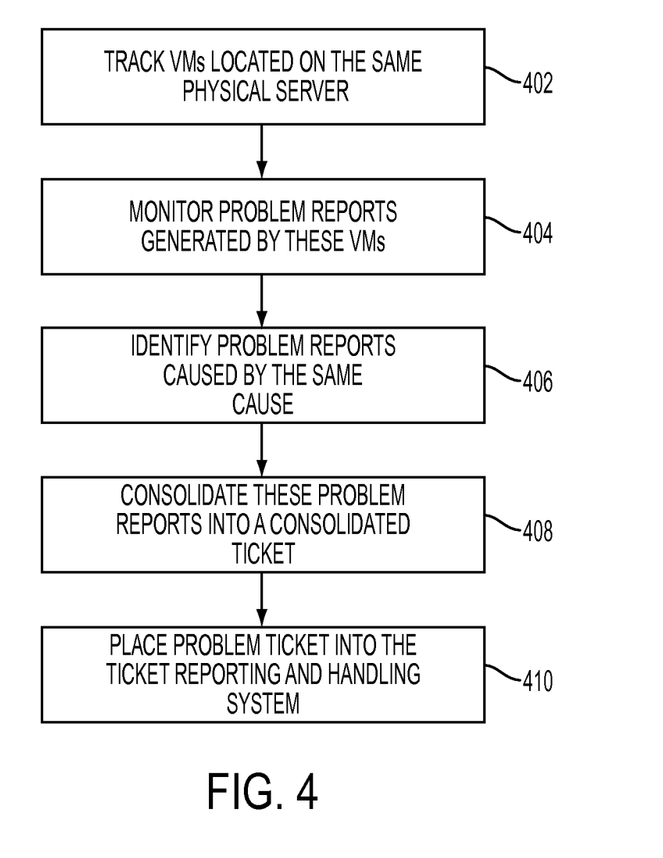
FIG. 4 illustrates a method in one embodiment of a ticket consolidation that analyzes problem reports and identifies problem tickets that are caused by the same problem on the same physical server.

In another embodiment of the present disclosure, ticket consolidation may be performed at a local level, e.g., at a physical server. For instance, in a virtualized environment, several operating system or VM images are executed concurrently on the same physical server. A single hardware failure on the server can cause several VMs allocated on that server to report problems and open problem tickets. FIG. 4 illustrates a method in one embodiment of a ticket consolidation that analyzes problem reports and identifies problem reports that are caused by the same problem on the same physical server. The reports caused by the same problem on the same physical server are consolidated into a single representative problem ticket, which may be then given a higher priority than would be for a regular (single) ticket caused by the same problem, and is entered into the problem ticket handling system.

Referring to FIG. 4, the VMs that are allocated to the same physical server or the same hypervisor may be identified at 402. At 404, problem reports generated by those VMs are monitored. At 406, the problem reports caused by the same or substantially the same hardware cause are identified. At 408, those identified problem reports as being caused by the same or substantially the same hardware cause are consolidated into a single ticket or a representation of a single ticket, multiple tickets linked to represent a single ticket. At 410, the problem ticket is placed into the ticket reporting and handling system. Examples of the types of problems which can be consolidated may include but are not limited to, hardware failure such as fan failure, power supply failure, adapter failure, central processing unit (CPU) failure, memory/DIMM problems, and full storage disk.

In this embodiment, a ticket consolidator functions at the hypervisor level, e.g., monitoring and correlating tickets or problem reports from multiple virtual machines executed within the same hypervisor on the same physical server. In another embodiment, a first hypervisor may have several "second level guest" hypervisors executing under a common "first level" hypervisor, such as is possible on IBM®'s advanced System z servers, and multiple VMs executed in multiple hypervisors on the same physical servers may be similarly tracked and associated with a common physical server.

Figure 5:
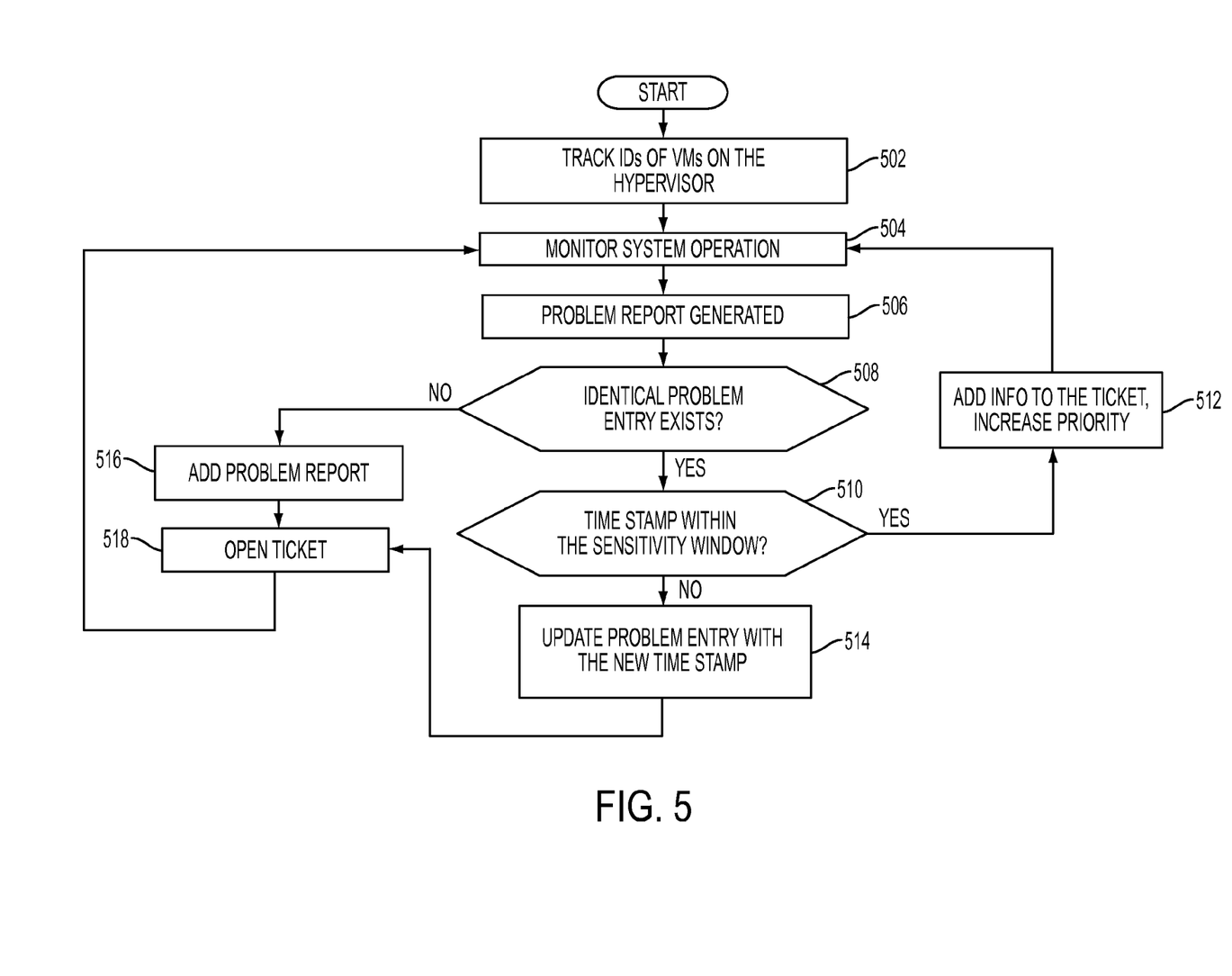
FIG. 5 is a flow diagram illustrating a method of consolidating tickets generated by multiple virtual machines executed within the same hypervisor in one embodiment of the present disclosure.

FIG. 5 is a flow diagram illustrating a method of consolidating tickets generated by multiple virtual machines executed within the same hypervisor in one embodiment of the present disclosure. At 502, identifiers of VMs on a hypervisor or physical server are generated. The identifiers of VMs may be kept or stored, and problem reports associated with the VMs may be stored. For instance, a table (referred to herein as VM ID table, for sake of explanation) or the like data structure may be used to store the list of VMs active on the hypervisor, e.g., by the VMs' IDs; Another table (referred to herein as problem reports table, for sake of explanation) may be created to store problem reports associated with VMs. The problem reports table may include entries that track events, problem symptom, and/or message ID, a timestamp when the problem report was generated, and a VM ID of the VM for which it was generated. The problem reports table is checked and updated for each newly generated problem report in one embodiment of the present disclosure.

At 504, system operations are monitored. At 506, a problem report generated by a VM is detected. At 508, it is checked to determine whether the identical problem entry exists for any VM. Here "identical" means "substantially similar within a similarity threshold qualifying the tickets to be consolidated"; thus, the problem that is exactly identical of said another possible entry or not exactly identical but substantially identical or similar to said another possible entry can be a candidate for consolidation. A data structure storing the problem reports such as the problem reports table discussed above may be read to determine whether the table has an entry with the same or substantially the same problem report or one with the same or substantially the same symptoms. At 510, it is determined whether the timestamp of the existing entry with the same or substantially the same problem report is within the sensitivity time window. The sensitivity time window may be configurable and/or programmable, and specifies a threshold time range or period, within which if two or more same problems are reported, the problem reports are consolidated into a single ticket or representation of a single ticket. If the time stamp is within the sensitivity time window, information about the currently detected problem report is added to the problem ticket. The priority of the problem ticket may be increased, for instance, for quicker resolution. The processing continues at 504, monitoring for more problem reports. A "time stamp" can for example represent one of (but not limited to) the time the reported problem occurred, or the time the problem is detected, or the time the problem is reported.

If the time stamp is outside the sensitivity time window, the problem report entry is updated at 514 with the new time stamp, the time stamp of the currently detected problem report. At 518, the problem ticket is opened. The processing continues to 504, monitoring for more problem reports.

If at 508, it is determined that no identical problem entry exists in the problem reports table or the like, a new entry associated with the currently detected problem report is added to the problem reports table or the like at 506. At 518, the problem ticket is opened. The processing continues to 504, monitoring for more problem reports.

Figure 6:
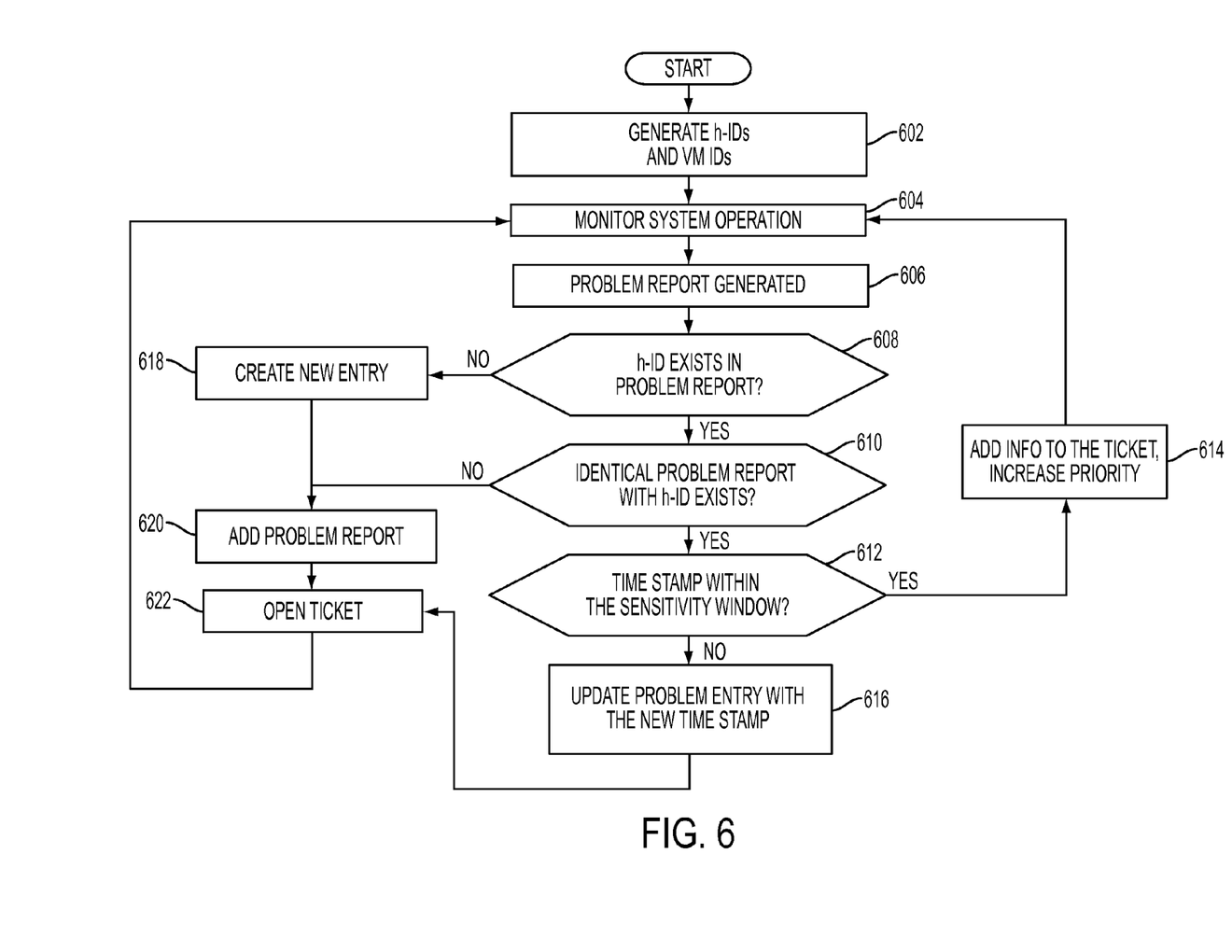
FIG. 6 is a flow diagram illustrating a method of ticket consolidating across multiple hypervisors in one embodiment of the present disclosure.

Yet in another embodiment of the present disclosure, the ticket consolidating may be performed at a centralized location, such as the Event Aggregation and Correlation location to perform ticket consolidation among VMs running on different hypervisors. FIG. 6 is a flow diagram illustrating ticket consolidating across multiple hypervisors in one embodiment of the present disclosure. In this embodiment, a ticket consolidator may be located centrally, for instance, in the central event aggregation and correlation system or the like, and monitors and correlates problem tickets across multiple hypervisors. At 602, IDs of hypervisors participating in ticket consolidation are generated and stored. In addition, a list of VMs' IDs running on the hypervisors is generated and stored. For instance, there may be a table for each hypervisor, identified by a hypervisor ID, hID. Each hypervisor's table includes a list of VMs running on the respective hypervisor, for instance, by VM IDs. Another table, referred to herein as a problem reports table may be generated for storing problem reports, for instance, for tracking events, and storing problem symptom and/or message ID, VM ID, and a timestamp indicating when the problem report was generated. "Time stamp" can be—depending on implementation, or on the problem—one of the times mentioned above—time the problem occurred, time the problem was detected, or time the report is generated. Other event times also may be used for time window sensitivity. In one embodiment, there is a separate problem reports table for each hypervisor, in another embodiment, a single problem reports table is used by multiple hypervisors to collect all problem reports.

At 604, system operations are monitored. At 606, a problem report generated is detected, and the identifiers of the VM that generated the problem report and the hypervisor the VM is running on are identified. At 608, in the embodiment with a single problem reports table for multiple hypervisors, the problem reports table is checked to determine whether a problem report entry associated with the hypervisor associated with the VM generating the problem report exists. If the hypervisor identification hID does not exist in the problem reports table, a new entry is added to the said table at 618. The problem report is added to the problem reports table at 620. At 622, a problem ticket is opened for this problem report. The processing returns to 604 and continues to monitor the system operations.

If at 608, it is determined that hID of the hypervisor hosting the VM that generated the problem report exists in the problem reports table, the problem reports table is checked to determine whether an entry already exists for the identical problem or substantially identical problem with the same hID, as the hypervisor ID hosting the VM that generated the problem report in the problem reports table at 610. Here "identical" means the same or "substantially similar within a similarity threshold qualifying the tickets to be consolidated", rather than by the exact identical of said another possible entry. If there is no entry for the same or substantially the same problem in the problem reports table, an entry for the problem report is added to the problem reports table at 620. At 622, a problem ticket is opened for this problem report. The processing returns to 604 and continues to monitor the system operations.

In an embodiment in which there are multiple problem reports table, i.e., one for each hypervisor, the problem reports table associated with the hypervisor that is hosting the VM generating the problem is checked at 608.

If at 610, an entry storing the identical problem to the generated problem report already exists in the problem reports table, and the hID associated with the stored entry is the hID of the hypervisor hosting the VM that generated the problem report, the timestamp associated with the existing entry is checked at 612. If at 612, it is determined that the timestamp is within the sensitivity time window, indicating that the generated problem report and the identical problem report existing in the problem reports table occurred within a threshold time period, the generated problem report is consolidated with the existing entry. At 614, for instance, the information about the generated problem report is added to the existing problem ticket opened for the existing entry. In addition, the priority of the existing problem ticket is increased in one embodiment of the present disclosure. The processing returns to 604 and continues to monitor the system operations.

If at 612, it is determined that the timestamp is outside the sensitivity time window, the existing problem report entry in the problem reports table is updated with the new timestamp, the timestamp of the generated (current) problem report. At 622, a problem ticket is open for this generated problem report. The processing returns to 604 and continues to monitor the system operations.

Figure 7:
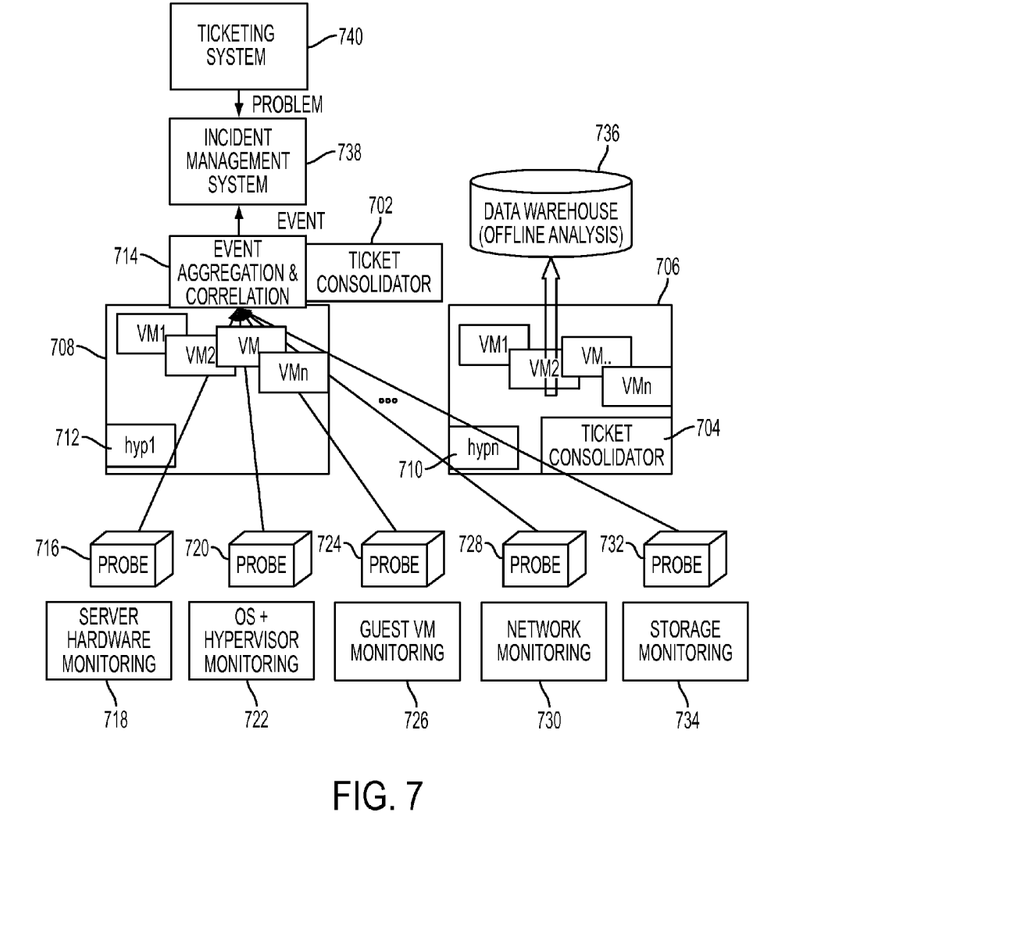
FIG. 7 is an architectural diagram illustrating a ticket consolidator at a local level in one embodiment of the present disclosure.

FIG. 7 is an architectural diagram illustrating a ticket consolidator at a local level in one embodiment of the present disclosure. In this embodiment, a plurality of ticket consolidators 702, 704 may be implemented in different locations, 702, 704, e.g., on different physical machines 706, 708 also referred to as hosts. A ticket consolidator 704 may be located locally on each physical machine 706 at the hypervisor level 710, to monitor problem reports generated in that physical machine 706 and to consolidate tickets created at that physical machine level. In addition, a ticket consolidator 702 may be centralized for a group of servers 708, 706 at the event aggregation and correlation level.

Each server or host 708, 706 may run a hypervisors 712, 710, respectively that support multiple operating systems, providing a multiple virtual machine environment. One or more monitoring tools such as Server Hardware Monitoring 718, Operating System (OS) and Hypervisor Monitoring 722, Guest VM monitoring 726, Network Monitoring 730 and Storage Monitoring 734 may employ associated probes 716, 720, 724, 728, 732, respectively, to monitor system operations based on the data collected by the probes. For instance, one or more server hardware monitoring probe 718 may collect metrics related to server hardware; an OS and hypervisor monitoring probe 722 may collect measurement data related to operating systems and hypervisors, guest VM monitoring probe 726 may collect metrics data related to guest VMs on the system, network monitoring probe 730 may collect metrics data associated with the network, and storage monitoring probe 734 may collect metrics associate with storage systems. Other probes and monitoring may be present.

The event aggregation and correlation module 714 may receive events based on the metrics associated with the various system operations collected by the probes (e.g., 716, 720, 724, 728, 732), and merge any duplicate events, and/or integrate multiple events into a fewer representative ones. The monitoring tools (e.g., 718, 722, 726, 730, 734) may automatically generate tickets based on the metrics collected by the probes (e.g., 716, 720, 724, 728, 732) and or the events processed in the event aggregation and correlation module 302. An Incident Management System 738 may collect the generated tickets and assign tasks to appropriate individuals such as system administrators or technical support persons to handle and resolve the problems indicated in the tickets. A Ticketing System 740 may also generate tickets, for instance, based on customer reported problems or issues. Metrics and/or correlated events may be warehoused and stored, for example, in a data warehouse 336.

In one embodiment of the present disclosure, the ticket consolidator 704 of the present disclosure in one embodiment may detect problem reports associated with VMs generated based on the metrics collected from the probes, consolidate identical reports into a single ticket, for instance, as described above in reference with FIGS. 4, 5 and 6.

In the present disclosure, the references to the terminologies "identical problem", "same problem", "identical cause", "same cause", "same error", "identical error" mean the same or substantially the same or similar. Hence, the consolidation of tickets need not require exact identification of the problems. For example, "identical"-ness and "same"-ness may be determined based on whether the problems or causes are "substantially similar within a similarity threshold qualifying the tickets to be consolidated".

Figure 8:
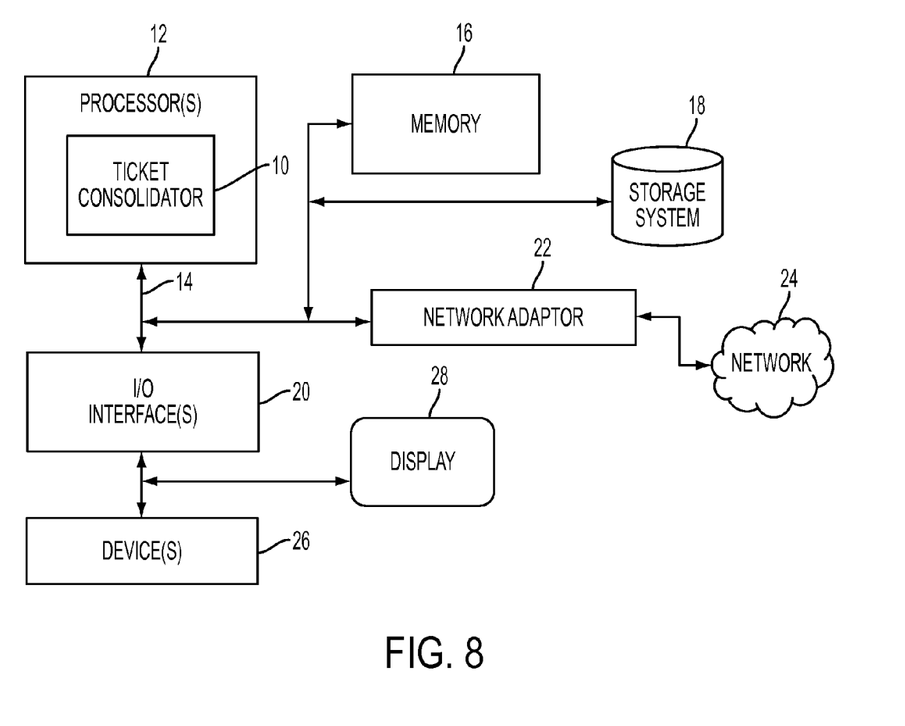
FIG. 8 illustrates a schematic of an example computer or processing system that may implement the ticket consolidation system in one embodiment of the present disclosure.

FIG. 8 illustrates a schematic of an example computer or processing system that may implement the ticket consolidation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a ticket consolidator module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of monitoring and consolidating problems in a computing environment comprising:
    tracking a plurality of machines with a same runtime configuration by maintaining a first table of machine identifiers;
    monitoring problem reports generated by the plurality of machines by maintaining a second table storing the problem reports from the plurality of machines;
    analyzing a problem report generated associated with a machine in the computing environment;
    identifying if a problem indicated in the problem report has also been reported in another machine having the same runtime configuration as the machine, said another machine and the machine's runtime configuration preconfigured using same settings;
    if said problem has been reported in said another machine having the same runtime configuration, determining whether the generated problem report and the problem reported in said another machine are within a given sensitivity time window;
    if the generated problem report and the problem reported in said another machine are determined to be within the given sensitivity time window, consolidating the generated problem report and the problem reported in said another machine into a single representative problem ticket;
    if the generated problem report and the problem reported in said another machine are determined to be outside the given sensitivity time window, generating a new problem ticket including information associated with the generated problem report.

2. The method of claim 1, wherein the single representative problem ticket is prioritized.

3. The method of claim 1, wherein said single representative problem ticket or said generated new problem ticket is entered into an incident monitoring and handling system and incident management system.

4. The method of claim 1, further including maintaining and updating a list of problem reports including associated timestamps indicating when the problem reports were generated and identification of entities reporting problems in the problem reports.

5. The method of claim 1, wherein the machine and said another machine are homogeneous virtual machines having same runtime configuration settings, wherein the machine and said another machine are two different virtual machine instances created from same configuration template.

6. The method of claim 1, wherein the machine and said another machine are physical server machines having same physical resources.

7. The method of claim 1, wherein said consolidating the generated problem report and the problem reported in said another machine into a single representative problem ticket includes adding information associated with said machine and said another machine to a same single problem ticket.

8. The method of claim of claim 1, wherein said consolidating the generated problem report and the problem reported in said another machine into a single problem ticket includes generating a related problem ticket and linking the related problem ticket to a problem ticket associated with the problem reported in said another machine.

9. A method of monitoring and consolidating problems detected in virtual machines running on one or more hypervisors in a computing environment, comprising:
    analyzing a generated problem report associated with a virtual machine;
    identifying a hypervisor running the virtual machine, the hypervisor running a plurality of virtual machines, the virtual machine being one of the plurality of virtual machines, wherein the plurality of virtual machines are tracked by maintaining a first table of virtual machine identifiers and hypervisor identifiers, and wherein problem reports generated by the plurality of virtual machines are monitored by maintaining a second table storing the problem reports from the plurality of virtual machines;
    determining whether there exists same or substantially same problem reported by another of the plurality of virtual machines associated with the identified hypervisor;
    in response to determining that there exists the same or substantially same problem reported associated with the identified hypervisor, determining whether the generated problem report and the same or substantially same problem reported associated with the identified hypervisor are within a given sensitivity time window; and
    in response to determining that the generated problem report associated with the virtual machine and the same or substantially same problem report associated with the identified hypervisor are within the given sensitivity time window, consolidating the generated problem report associated with the virtual machine and said existing same or substantially same problem report associated with the identified hypervisor.

10. The method of claim 9, further including:
    in response to determining that timings of the generated problem report associated with the virtual machine and the same or substantially same problem report associated with the identified hypervisor are outside the given sensitivity time window, updating a problem entry associated with the same or substantially same problem report associated with the identified hypervisor to include information associated with the generated problem report associated with the virtual machine.

11. The method of claim 9, further including:

in response to determining that there does not exist same or substantially same problem reported associated with the identified hypervisor, storing information associated with the generated problem report and opening a new problem ticket for the generated problem report.

12. The method of claim 9, wherein the generated problem report and said existing same or substantially same problem report associated with the identified hypervisor are generated from two different virtual machines running on the same hypervisor.

13. A non-transitory computer readable storage medium storing a program of instructions executable by a machine to perform a method of monitoring and consolidating problems in a computing environment, the method comprising:

tracking a plurality of machines with a same runtime configuration by maintaining a first table of machine identifiers;

monitoring problem reports generated by the plurality of machines by maintaining a second table storing the problem reports from the plurality of machines;

analyzing a problem report generated associated with a machine in the computing environment;

identifying if a problem indicated in the problem report has also been reported in another machine having the same runtime configuration as the machine, said another machine and the machine's runtime configuration preconfigured using same settings;

if said problem has been reported in said another machine having the same runtime configuration, determining whether the generated problem report and the problem reported in said another machine are within a given sensitivity time window;

if the generated problem report and the problem reported in said another machine are determined to be within the given sensitivity time window, consolidating the generated problem report and the problem reported in said another machine into a single representative problem ticket;

if the generated problem report and the problem reported in said another machine are determined to be outside the given sensitivity time window, generating a new problem ticket including information associated with the generated problem report.

14. The computer readable storage medium of claim 13, wherein the single representative problem ticket is prioritized.

15. The computer readable storage medium of claim 13, wherein said single representative problem ticket or said generated new problem ticket is entered into an incident monitoring and handling system and incident management system.

16. The computer readable storage medium of claim 13, further including maintaining and updating a list of problem reports including associated timestamps indicating when the problem reports were generated and identification of entities reporting problems in the problem reports.

17. The computer readable storage medium of claim 13, wherein the machine and said another machine are homogeneous virtual machines having same runtime configuration settings, wherein the machine and said another machine are two different virtual machine instances created from same configuration template.

18. The computer readable storage medium of claim 13, wherein the machine and said another machine are physical server machines having same physical resources.

19. The computer readable storage medium of claim 13, wherein said consolidating the generated problem report and the problem reported in said another machine into a single representative problem ticket includes adding information associated with said machine and said another machine to a same single problem ticket.

20. The computer readable storage medium of claim of claim 13, wherein said consolidating the generated problem report and the problem reported in said another machine into a single problem ticket includes generating a related problem ticket and linking the related problem ticket to a problem ticket associated with the problem reported in said another machine.

21. A non-transitory computer readable storage medium storing a program of instructions executable by a machine to perform a method of monitoring and consolidating problems detected in virtual machines running on one or more hypervisors in a computing environment, comprising:

analyzing a generated problem report associated with a virtual machine;

identifying a hypervisor running the virtual machine, the hypervisor running a plurality of virtual machines, the virtual machine being one of the plurality of virtual machines, wherein the plurality of virtual machines are tracked by maintaining a first table of virtual machine identifiers and hypervisor identifiers, and wherein problem reports generated by the plurality of virtual machines are monitored by maintaining a second table storing the problem reports from the plurality of virtual machines;

determining whether there exists same or substantially same problem reported by another of the plurality of virtual machines associated with the identified hypervisor;

in response to determining that there exists the same or substantially same problem reported associated with the identified hypervisor, determining whether the generated problem report and the same or substantially same problem reported associated with the identified hypervisor are within a given sensitivity time window; and in response to determining that the generated problem report associated with the virtual machine and the same or substantially same problem report associated with the identified hypervisor are within the given sensitivity time window, consolidating the generated problem report associated with the virtual machine and said existing same or substantially same problem report associated with the identified hypervisor.

22. The computer readable storage medium of claim 21, further including:

in response to determining that timings of the generated problem report associated with the virtual machine and the same or substantially same problem report associated with the identified hypervisor are outside the given sensitivity time window, updating a problem entry associated with the same or substantially same problem report associated with the identified hypervisor to include information associated with the generated problem report associated with the virtual machine.

23. The computer readable storage medium of claim 21, wherein the generated problem report and said existing same or substantially same problem report associated with the identified hypervisor are generated from two different virtual machines running on the same hypervisor.

24. A system for monitoring and consolidating problems in a computing environment comprising:
- a processor, the processor operable to track a plurality of machines with a same runtime configuration by maintaining a first table of machine identifiers, the processor further operable to monitor problem reports generated by the plurality of machines by maintaining a second table storing the problem reports from the plurality of machines;
- a ticket consolidator module operable to execute on the processor and further operable to analyze a problem report generated associated with a machine in the computing environment, the ticket consolidator module further operable to identify if a problem indicated in the problem report has also been reported in another machine having the same runtime configuration as the machine, said another machine and the machine's runtime configuration pre-configured using same settings, and if said problem has been reported in said another machine having the same runtime configuration, the ticket consolidator module operable to determine whether the generated problem report and the problem reported in said another machine are within a given sensitivity time window, if the generated problem report and the problem reported in said another machine are determined to be within the given sensitivity time window, the ticket consolidator module operable to consolidate the generated problem report and the problem reported in said another machine into a single representative problem ticket, and if the generated problem report and the problem reported in said another machine are determined to be outside the given sensitivity time window, the ticket consolidator module operable to generate a new problem ticket including information associated with the generated problem report.

25. The system of claim 24, wherein the single representative problem ticket is prioritized.

26. The system of claim 24, wherein the machine and said another machine are homogeneous virtual machines having same runtime configuration settings, wherein the machine and said another machine are two different virtual machine instances created from same configuration template.

27. The system of claim 24, wherein the machine and said another machine are physical server machines having same physical resources.

28. A system for monitoring and consolidating problems detected in virtual machines running on one or more hypervisors in a computing environment, comprising:
- a processor;
- a ticket consolidator module operable to analyze a generated problem report associated with a virtual machine and identify a hypervisor running the virtual machine, the hypervisor running a plurality of virtual machines, the virtual machine being one of the plurality of virtual machines, wherein the plurality of virtual machines are tracked by maintaining a first table of virtual machine identifiers and hypervisor identifiers, and wherein problem reports generated by the plurality of virtual machines are monitored by maintaining a second table storing the problem reports from the plurality of virtual machines, the ticket consolidator module further operable to determine whether there exists same or substantially same problem reported by another of the plurality of virtual machines associated with the identified hypervisor, and in response to determining that there exists the same or substantially same problem reported associated with the identified hypervisor, the ticket consolidator module further operable to determine whether the generated problem report and the same or substantially same problem reported associated with the identified hypervisor are within a given sensitivity time window, and in response to determining that the generated problem report associated with the virtual machine and the same or substantially same problem report associated with the identified hypervisor are within the given sensitivity time window, the ticket consolidator module further operable to consolidate the generated problem report associated with the virtual machine and said existing same or substantially same problem report associated with the identified hypervisor.

29. The system of claim 28, wherein the generated problem report and said existing same or substantially same problem report associated with the identified hypervisor are generated from two different virtual machines running on the same hypervisor.

* * * * *